Patented Feb. 14, 1933

1,897,816

UNITED STATES PATENT OFFICE

DONALD F. OTHMER, OF ROCHESTER, NEW YORK, ASSIGNOR TO EASTMAN KODAK COMPANY, OF ROCHESTER, NEW YORK, A CORPORATION OF NEW YORK

PROCESS FOR THE DEHYDRATION OF ACETIC ACID

No Drawing. Application filed January 19, 1931. Serial No. 509,877.

This invention relates to the production of substantially dehydrated acetic acid and more particularly to a process for dehydrating or concentrating aqueous acetic acid solutions by the use of triethanolamine.

Numerous processes have been devised for dehydrating aqueous acetic acid solutions. Some of these processes employ as an extracting agent compounds which will preferentially dissolve acetic acid from its aqueous solution. Other processes esterify the acetic acid and separate the ester. Still other processes employ a third component which by its action in changing the effective vapor pressure of either the water or the acid in relation to the other, allow the one or the other to be removed. These processes have their separate advantages and also disadvantages which are more or less troublesome depending upon the process.

I have discovered that aqueous solutions of acetic acid may be concentrated by a process employing triethanolamine, which process in some respects combines a plurality of the above principles. Briefly stated, my process comprises merely mixing triethanolamine with aqueous acetic acid, distilling off water and further heating until substantially dehydrated acetic acid is driven off leaving behind triethanolamine or some modification thereof which can be reused in further dehydrating aqueous acetic acid. Whatever may be the theories advanced herein, it will, of course, be understood that they are merely an attempt to explain the mechanism of this process and that the process is in no way limited thereby, but on the other hand is as broadly stated above.

It is therefore among the objects of my invention to provide a process for concentrating or dehydrating aqueous acetic acid solutions by the use of triethanolamine or some equivalent thereof.

Triethanolamine is a high boiling liquid having a boiling point well above 200° C. as compared to the boiling point of approximately 118° C. for acetic acid. It is a compound which readily esterifies with acetic acid inasmuch as it is analogous to ammonia but consists of three hydroxy ethyl groups linked to the nitrogen atom in place of the three hydrogen atoms of ammonia. The high boiling point of both the triethanolamine as well as the acetic acid esters or any other compounds involving the direct chemical combination of acetic acid with triethanolamine makes the separation of water therefrom by distillation a relatively easy matter. The fact also that the esters or the other direct compounds resulting from the union of acetic acid and triethanolamine may be readily broken down with heat into acetic acid and triethanolamine or similar reversion products makes possible the separation of acetic acid into a relatively pure or at least easily refined form.

As an example of my process, approximately 800 lbs. of technical triethanolamine from a previous run was mixed with approximately 300 lbs. of 33% aqueous acetic acid. Neutralization of the acetic acid was facilitated by stirring and heating the foregoing mixture in a stillpot. Advantageously the neutralization is carried out under a vacuum, heat and stirring being applied to the mixture during the evacuation which is brought down to and maintained at a pressure of, for instance, 3 to 8 mm. of mercury absolute pressure. After allowing a reasonable time for neutralization of the acetic acid by the triethanolamine to take place, removal of the water from the reaction mass is accomplished by distilling the mixture under the foregoing vacuum.

The vacuum is employed in order that the water may be removed at so low a temperature as to minimize the possibility of acetic acid being broken off or other decomposition of the amine molecule taking place. When approximately 200 lbs. of water has been distilled away from the reaction mixture, it will be found that the temperature rises slowly from approximately 35 to about 90° C. accompanied by the driving-over from the stillpot of some acetic acid (this may be due to slightly incomplete neutralization of the acetic acid or to some decomposition of the amine molecule.) Within a very short range, in terms of distillate passing over, the acid concentration of the distillate quickly rises to about 65% (which, of course, may be rectified to glacial acetic by the usual means) and from there gradually to 95% or higher as the last of the acetic acid is driven off from the reaction mixture. The distillation is continued until the temperature rises to approximately 140 to 150° C. at which temperature it will be found that substantially all of the acetic acid which has entered into combination with the triethanolamine has been reverted to acetic acid and driven over as a distillate leaving behind triethanolamine or some equivalent reversion product which can be reused in again carrying out the process.

It has been found that a small percentage of compounds other than acetic acid pass over with the concentrated acetic acid. Whether these compounds which are impurities to acetic acid consist of acetic anhydride or decomposition products of the amine is immaterial as these impurities may be separated from the acetic acid by the ordinary rectification process well known in the art whereby pure glacial acetic acid can be obtained.

One of the striking features of my process is that not only does the triethanolamine combine with the acetic acid without greatly altering the partial vapor pressure of the water present but the reaction products formed still maintain complete miscibility with water. Thus, the water can be distilled off from the mixture without any undue complications, following which the reaction products may be decomposed into acetic acid and amines at a temperature above the boiling point of the water (at the pressure employed) but very considerably below the boiling point of the amines themselves or the reaction products resulting from the neutralization of the acetic acid with the triethanolamine.

While the process has been described as a batch operation, it is not confined thereto inasmuch as the broad principle of the invention is novel and it is ultimately immaterial whether the invention is utilized as a batch process or continuous process wherein more complicated mechanism may be used to carry it out than herein described for the simple batch operation.

What I claim as my invention and desire to be secured by Letters Patent of the United States is:

1. The process of dehydrating aqueous acetic acid which comprises neutralizing aqueous acetic acid with triethanolamine and then by means of heat driving off the water from the reaction mass.

2. The process of dehydrating aqueous acetic acid which comprises neutralizing aqueous acetic acid with triethanolamine and then by means of heat driving off the water from the reaction mass followed by thermal decomposition of the reaction products into acetic acid and amines and separating the acetic acid from the amines.

3. In the process of dehydrating or concentrating aqueous acetic acid the steps which comprise neutralizing the acetic acid with triethanolamine, driving off water from the reaction mass, and then decomposing the reaction products into a plurality of components including acetic acid.

4. In the process of dehydrating or concentrating aqueous acetic acid the steps which comprise neutralizing the acetic acid with triethanolamine, driving off water from the reaction mass, and then decomposing the reaction products into a plurality of components including acetic acid and a plurality of amines followed by separating the acetic acid from the amines.

5. In the process of dehydrating or concentrating acetic acid the steps which comprise neutralizing the acetic acid with triethanolamine, driving off water from the reaction mass and then decomposing the reaction products into a plurality of components including acetic acid and a plurality of amines followed by separating the acetic acid from the amines by distillation.

6. In the process of dehydrating or concentrating aqueous acetic acid the step which comprises neutralizing the acetic acid with triethanolamine and separating a substantial proportion of the water from the reaction products by distillation without accompanying substantial decomposition of the reaction products.

Signed at Rochester, New York this 10th day of January 1931.

DONALD F. OTHMER.